United States Patent [19]
Petiet

[11] 3,710,921
[45] Jan. 16, 1973

[54] SELECTION APPARATUS

[75] Inventor: Jakobus Petiet, Leiden, Netherlands

[73] Assignee: N.V. Leidsche Apparatenfabriek, Leiden, Netherlands

[22] Filed: March 16, 1971

[21] Appl. No.: 124,995

[30] Foreign Application Priority Data

June 10, 1970 Netherlands ..................... 7008445

[52] U.S. Cl. ................ 198/33 AA, 198/211, 221/75, 221/161
[51] Int. Cl. .............................................. B65g 47/24
[58] Field of Search .... 198/25, 211, 33 AA; 221/237, 221/160, 161, 162, 159, 167

[56] References Cited

UNITED STATES PATENTS

| 2,922,445 | 1/1960 | Osmond et al. | 198/25 X |
| 2,169,772 | 8/1939 | Schweitzer | 118/324 X |

FOREIGN PATENTS OR APPLICATIONS

| 681,624 | 10/1952 | Great Britain | 221/162 |

Primary Examiner—Evon C. Blunk
Assistant Examiner—Douglas D. Watts
Attorney—Fleit, Gipple & Jacobson

[57] ABSTRACT

An apparatus for transmitting subjects closed at one end, such as bottle caps, from a supply container containing the subjects in random orientations, to a device for further use of the subject. A transport device transports the subjects one by one in a continuous row from a supply container along a finite transport track, and a device removes the subjects from the end of the transport track in predetermined orientations. Improperly oriented subjects are rejected and returned to the supply container. The removal device comprises a plurality of uniformly distributed removers connected to a common endless carrier and protruding from such carrier. The removers are moved continuously by the carrier with a velocity equal to the transport velocity of the subjects and are located over and adjacent to the last subject at the end of said transport track. Means are provided for thrusting the removers perpendicularly to the transport direction of the subjects when such removers are adjacent the last subject on the track.

8 Claims, 6 Drawing Figures

SELECTION APPARATUS

BACKGROUND OF THE INVENTION

The present invention relates to an apparatus for transmitting hollow elements having one closed end, such as bottle caps, from a supply container randomly housing such elements, to a device for further use of the elements. For purposes of illustration, the following pages will refer specifically to an apparatus for transporting bottle caps; but it should be understood that the present invention is not so limited.

There are known apparatus for transmitting bottle caps from a supply container to a cap supply trough, from which the caps are then applied to the necks of the bottles to be closed in a bottle closing device. Some of these known apparatus comprise a selection disk consisting of two disc parts spaced from each other having profiles at the adjacent sides thereof such that caps in only one predetermined orientation can be delivered by the rotating disks to the supply trough.

It is a common disadvantage of these known selection apparatus that the selection of caps takes place in dependence upon the peripheral sizes of the caps, with such apparatus being extremely sensitive to variations in cap size. This is a significant disadvantage because the peripheral sizes of bottle caps can vary considerably. In the first place, the shape of caps for bottles of non-alcoholic beverages is often the subject of variation since the shape of these caps is thought to be influential in the choice made by the consumer. Further, the sizes of these caps may vary after prolonged use due to damage, abrasion, deformation and many other causes. Moreover, the producer of the caps often varies the thickness of the material in an attempt to save material. In addition to all the above mentioned difficulties in the known selection apparatus, there is the disadvantage that change-over to other caps necessitates that the selection disks be readjusted or replaced by another set of disks. The readjustment and replacement of these disks is normally a difficult task.

SUMMARY OF THE INVENTION

It is an object of the present invention to provide a selection apparatus which avoids the above mentioned disadvantages. According to the invention this is achieved by the fact that the apparatus comprises the combination of a number of transport devices for transporting the caps one by one in continuous rows from a supply container, along finite transport tracks, and selection devices for taking the caps from the ends of the transport tracks in predetermined positions.

The selection devices comprise a number of uniformly distributed cap removers connected to common endless carriers. The cap removers protrude from such carriers and are moved continuously by said carriers with a velocity equal to the transport velocity of the caps in motion tracks. Each motion track associates with the selection device such that a remover is located over and adjacent the last cap at the end of the transport track. The selection devices include means for reciprocating the removers perpendicularly to the transport direction of the caps when such removers are adjacent readied caps.

In the apparatus according to the present invention, the caps to be selected are transported one by one in continuous rows but in random positions from the supply container to the ends of finite transport tracks. Cap removers of the selection apparatus are located above the ends of the transport tracks and are reciprocated into removing contact with the last cap in each transport track. If such a cap is oriented with its open end toward the cap remover, the remover enters the cap, takes same and transports it further, for example, to a supply trough for a bottle closing machine. If, however, the last cap on the transport track is oriented with its closed end toward the cap remover, or on its side, the cap remover cannot be pushed into the cap, and hence pushes the cap from the transport track and back into the supply container.

By the above described apparatus, the caps are transmitted in predetermined orientations whereby the selection takes place with respect to the internal size of the caps, which internal size is significantly more uniform and less subject to the deformation and damage than is the external size. Moreover, the cap removers according to the present invention can easily be made less sensitive to differences in internal size, for example, by making them tapered.

In the preferred embodiment of a selection apparatus, the device for the selected removal of the caps from the transport device consists of a circular selection disk rotatable about a horizontal shaft, spaced above the transport device, and provided with movable tubes protruding radially beyond the periphery of the disk. The ends of the tubes are provided with cap removers for insertion into the caps for removal and transport thereof. The shaft of the selection disk is located so as to lie in a plane passing through or just before the end of the transport device and perpendicular to the motion direction of the caps in the transport device.

The selection disk is rotated in the same direction as the direction of movement of the supplied caps, the cap removal means thus moving along a circular track in the plane through the center line of the supplied caps. Means are provided in the selection device for moving the tubes in a radial direction to the shaft of the disk when the tubes are moving toward the transport device, and means are provided for thrusting the tubes radially outwardly when they have reached the lowest point of their motion track, into a position wherein the cap removal means are adjacent the end of the transport device.

By means of the rotating disk, the tubes with the cap removal means are rotated continuously along a circular track, the lowest point of which is located just above the end of the transport track along which the caps to be selected are moved. Upon approach of this lowest point, the tubes are moved radially upwardly out of the plane of and in order to avoid contact with, the caps in the transport track. Only when the tube has reached the lowest point of its retracted motion, is it thrust outwardly into or against the last cap present on the transport track whereby the cap is either taken along by the cap removal means, or is rejected thereby and returned to the supply container.

The preferred embodiment is further achieved according to the present invention by the fact that the tubes are provided with cap removal means and are applied radially movable in recesses enclosed by side walls of the selection disk. The tubes extend radially from the periphery of the disk, and are provided with pins protruding perpendicularly therefrom beyond the disk and adapted to reciprocate in oblong slots radially provided with the side-wall of the disk. The recesses are provided with springs biasing the tubes radially outwardly. At the periphery of the disk, at the side thereof where the tubes protrude beyond the disk, a fixed cam track is provided, cooperates with the pins, and is shaped in a way such that the pins, upon riding along the cam track, are moved radially upwardly against the spring bias. The cam track ends just before the end of the transport track of the supplied caps.

By means of the biasing springs, the tubes are pushed radially outwardly, whereby the pins of the tube, rest against the lower ends of the oblong slots in the side wall of the disk, serving as stops preventing the pins from being pushed out of the recesses. Upon approaching the transport track along which the caps are supplied, the pins come into contact with the cam track, are moved radially inwardly against the bias of the springs, and upon reaching the lowest point of the circular track where the cam track ends, are released from the cam track and are thrust radially outwardly into or against the last cap present on the transport track.

According to another embodiment of the invention, the cap removal means take a different form. The removal means are there connected to the selection disk by means of resilient connecting pieces and are covered with a resilient material. In this construction, in which the cap removal means do not require an outward thrust in order to enter a cap, by the resilient construction thereof, fragile caps and caps subject to be easily twisted may be entered and handled without damage thereto.

In the preferred embodiment, the devices for supplying the caps one by one in continuous rows from the supply container each consist of two worm shafts extending parallel with respect to each other and rotating in reversed directions. The ends of the worm shafts lie in the supply container for the caps, with the worms being reversely directed in such a manner that the worm tops are adjacent each other, and with the distance between the worm shafts being such that the openings formed between the worm shafts can at least partially enclose the caps. Under the worm shafts there is provided a strip of material whereon the caps taken along by the worm shafts are guided. By means of the reversely rotating worm shafts, the openings formed by the adjacent worms take the caps and transport same to the ends of the worm shafts opposite the ends thereof in the supply container.

In the preferred embodiment, the end of the strip extending under the worm shafts is provided with a ball, the upper side thereof coinciding with the upper side of the strip. The ball serves as a rounded end of the strip and considerably reduces the chance of damage of a cap rejected by the cap removal means.

Preferably, the transport worms are at an from of inclination in the supply container, from which they slant upwardly toward the selection disk. The angle of inclination and the length of the worm shafts may be selected in a way such that the ends of the worm shafts are above the supply container and so that the rejected caps can fall back into the supply container.

The invention will be further described on the basis of the drawings wherein, as an example only, two embodiments of the invention are illustrated.

DETAILED DESCRIPTION OF THE DRAWINGS

Figure 1:
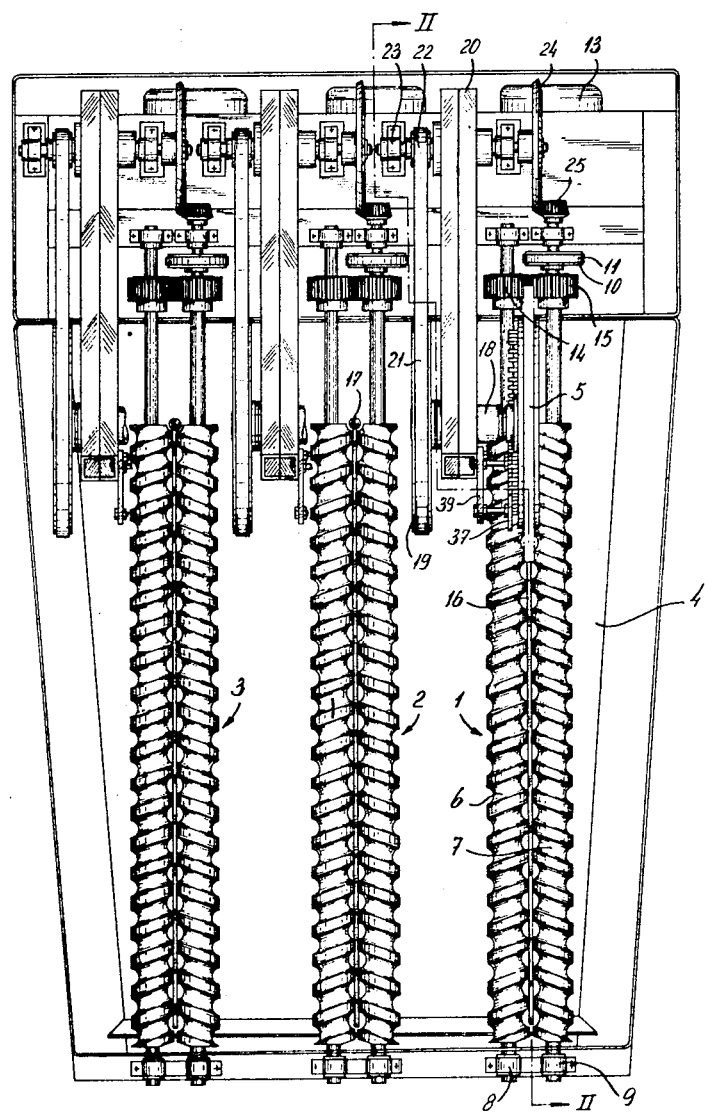
FIG. 1 shows a plan view of a selection apparatus for bottle caps, including three sections constructed according to the invention.
Figure 2:
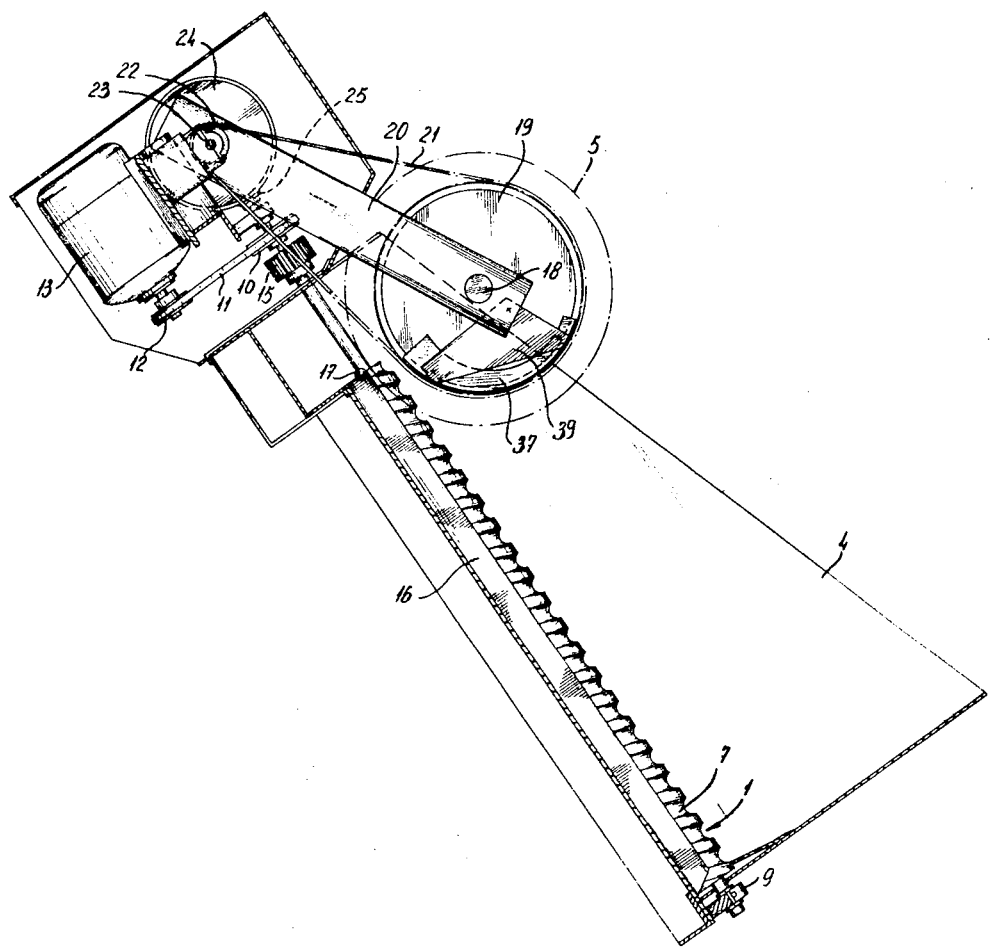
FIG. 2 shows a side view of the device taken along the line II—II of FIG. 1.

The apparatus shown in FIGS. 1 and 2 consists of three transport devices, 1, 2 and 3, extending parallel with respect to each other and provided in a supply container 4 for transporting bottle caps from the supply container, one by one, to respective selection disks 5 provided at one end of each transport device. For purposes of clarity, only one selection disk 5, belonging to the transport device 1, is shown in the figures. Each of the transport devices 1, 2 and 3 comprises a pair of parallel worm shafts 6 and 7 extending, at an angle, into the supply container 4.

As can be seen in FIG. 1, the worms of the worm shafts 6 and 7 are reversely directed, and are applied in such a manner that the worm tops are adjacent each other. The worm shafts are developed in such a manner that the openings formed between the worms is sufficient to enclose bottle caps. One end of each of the worm shafts 6 and 7 is rotatably supported in bearings 8 and 9, located respectively near the end wall and the bottom of the supply container 4. the opposite end of each worm shaft 7 The connected to a drive motor 13 via a belt pulley 10 mounted on the worm shaft, a belt 11, and a belt pulley 12 mounted on the shaft of the motor. This end of each worm shaft 7 is further provided with a gear 15 fixed thereto, cooperating with a similar gear 14 fixed to the adjacent end of each worm shaft 6.

In operation, the worm shaft 7 is rotated in one direction by the motor 13 via the pulley 12, the belt 11 and the pulley 10, while the worm shaft 6 is rotated in the reverse direction by the meshing gears 14 and 15. The directions of rotation of the respective worm shafts are selected such that the bottle caps from the supply container are transported by the worm shafts, one by one, in the direction toward the selection disks 5. The bottle caps are enclosed during this transport by two adjacent worm tops of the respective worm shafts. A metal strip 16 is provided between each pair of the worm shafts 6 and 7 for the support of the bottle caps, these strips being fixed to the bottom of the supply container 4, and extending from one end to the other of the worms. The end of each strip nearest its selection disk is provided with a ball 17, the function thereof being explained below.

The selection disks 5 are provided just above the ends of the worm shafts 6 and 7 and serve to remove the bottle caps from the regions of the worm shafts 6 and 7 and to transport same to a further location for use. The vertical planes of symmetry of the selection disks 5 coincide with the respective planes of symmetry of the sets of worm shafts 6 and 7. The selection disks 5 are each connected to one end of a horizontal rotation shaft 18, supported rotatably in the end of a supporting arm 20. On the other end of each shaft 18, is fixed a belt pulley 19 rotatably driven via a belt 21 and a belt pulley 22. Pulley 22 is fixed to a horizontal rotatable shaft 23 which, by means of a gear 24 mounted on the shaft, is driven by a pinion 25 fixed on the rotatable worm shaft 7. The respective pulleys are driven in such a manner that the rotation of the selection disk 5 is geared with the longitudinal motion of the bottle caps carried by the worm shafts 6 and 7, in the direction of the arrow 26 in FIG. 3. The center line of the horizontal rotation shaft 18 of the selection disk 5 is located so as to lie in a plane perpendicular to the longitudinal dimension of the worm shafts 6 and 7 and passing through the extreme ends of the worms, and is located so that the periphery of the disk 5 is spaced above the ends of the worm shafts.

Figure 3:
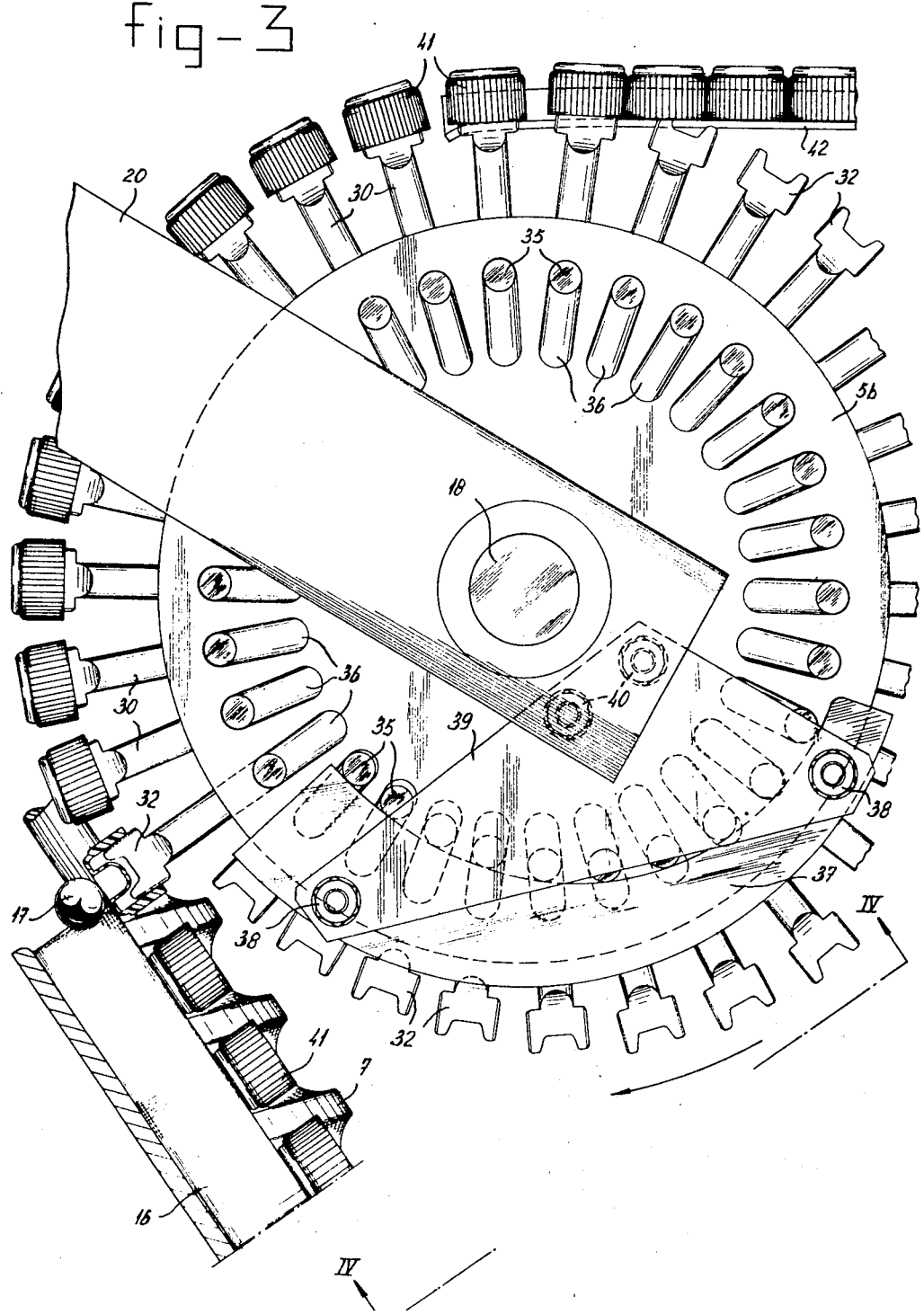
FIG. 3 shows, in an enlarged scale, a side view of a selection disk for taking up the bottle caps from the transport means.
Figure 4:
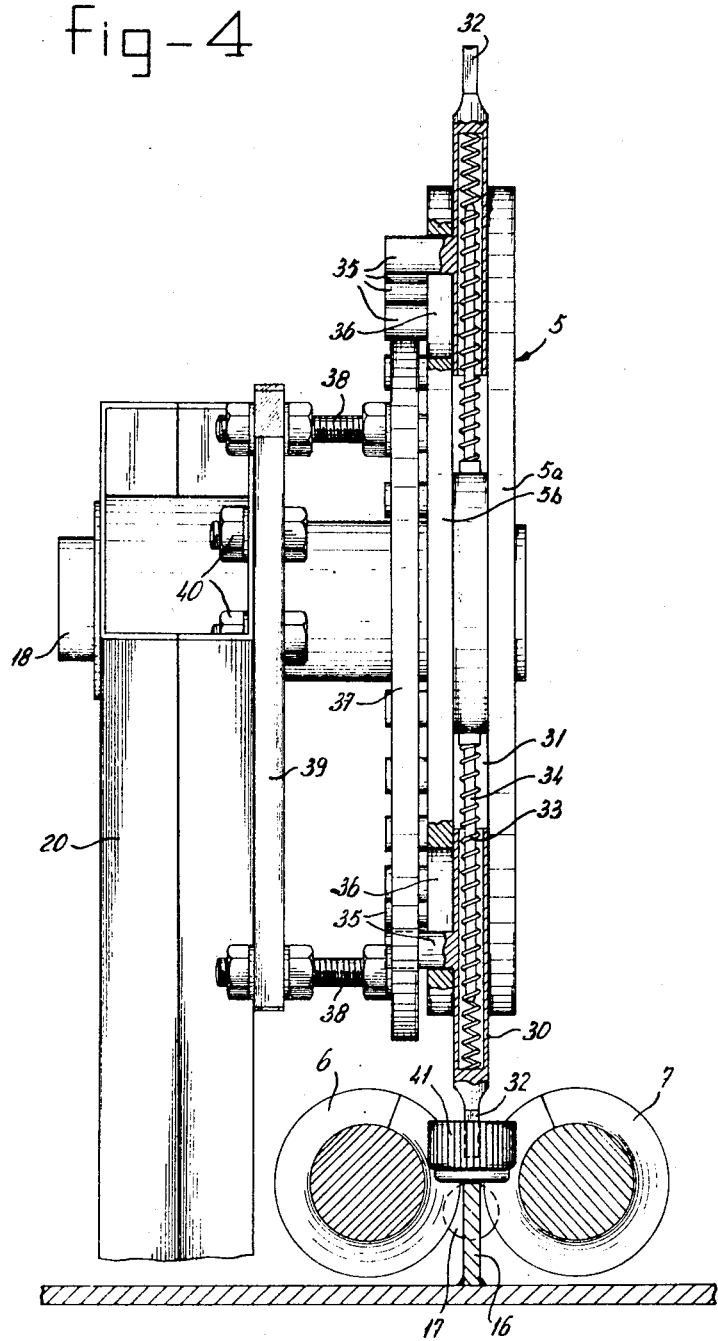
FIG. 4 shows a view of the selection disk taken along the line IV—IV of FIG. 3.

With reference now to FIGS. 3 and 4, one of the selection disks will be described. The circular selection disk 5 comprises a plurality of hollow uniformly spaced tubes 30 extending radially outwardly beyond the periphery of the disk. Tubes 30 are movably mounted in the disk for movement in radial directions in recesses 31 defined in the side walls 5a and 5b of the disk 5, the recesses 31 extending radially to the periphery of the disk. The ends of the tubes 30 extending beyond the periphery of the disk 5 are provided with cap removal means 32 integral with the disks, with the cap removal means being shaped in a manner as to hold fast the hollow bottle caps as may be seen in FIG. 3. The tubes 30 are biased radially outwardly by means of spiral springs 33 housed in the recesses 31, around a pin 34 extending radially in each recess 31. One end of the spring 33 pushes against the internal stop of the hollow tube 30, and the other end of the spring pushes against a stop on the pin 34. At a distance from their respective ends extending beyond the disk, the tubes 30 are fixed radially in the disk wall. Specifically, the radial motion of the tubes 30 in the recesses 31 is limited by means of integral pins 35 reciprocating in slots 36.

Spaced from the disk wall 5b, in the region of the motion track of the pins 35 protruding beyond the disk wall, and adjacent the worm shafts, there is provided a fixed shield 37, the upper edge of which defines a cam track cooperating with the pins 35. The upper edge of the shield 37 is curved and extends along the disk wall 5b with a gradually decreasing distance to the center of the disk in the direction of arrow 26. Upon rotation of the disk 5, the pins 35 of the tubes 30 come alternatingly into contact with the upper edge of the shield 37, whereby the pins, upon continuing rotation along the upper edge, are pushed radially in their slots 36 toward the center of the disk. In this manner, tubes 30 are pushed radially inwardly. The shield 37 ends just before the end of the worm shafts 6 and 7. When reaching the end of the shield, the pins 30 are released from the effect of the shield and are thrust outwardly by the action of springs 33 in the direction of the worm shafts 6 and 7. The shield 37 is connected to a plate 39 by means of spacer bolts 38, plate 39 also being connected to the support arm 20 by means of bolts 40.

The operation of the inventive apparatus is as follows. By means of the worm shafts 6 and 7 in the devices 1, 2 and 3, the screw caps 41 are transported one by one from the supply container 4, riding atop the support strips 16 to the ends of such strips. Simultaneously, the selection disks 5 with their tubes 30 are rotated in the direction of arrow 26. Upon approach of the tubes 30 to the ends of the worm shafts 6 and 7, the tubes are moved radially inwardly by the action of the pins 35 and the camming shield 37. When reaching the end of the shield, the tubes 30 are released and are thrust radially outwardly in the direction of the last of the bottle caps 41 on the worm shafts. When this last cap 41 on the worm shafts is positioned with its open end directed toward the selection disk 5, the cap removal means 32 of the tube 30 above this cap is forced in the cap by the thrust thereof, and the cap is taken along by the removal means and is rotated, with the disk 5. The cap is then delivered, for example, to a discharge trough 42, by means of which the bottle caps are guided to the bottle closing machine.

When the last bottle cap on the worm shafts is lying with its closed end directed toward the selection disk, the cap is pushed away from the strip 16 by the tube 30 and is rejected. The rejected cap 41 pivots about the ball and is returned to the supply container 4. The ball 17 thus serves to prevent damage to the rejected caps.

Figure 5:
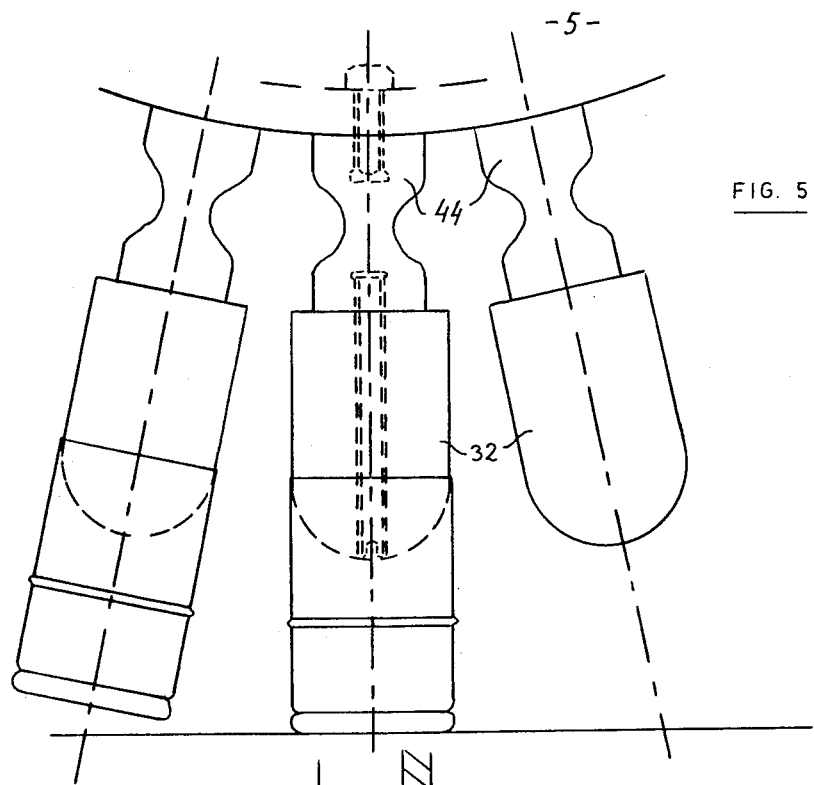
FIG. 5 shows a front view of another embodiment of the catch means, especially adapted for fragile caps.
Figure 6:
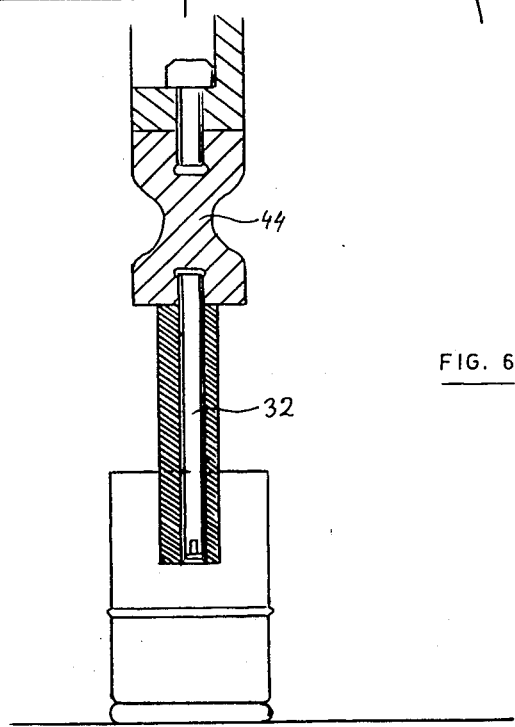
FIG. 6 shows the side view of the embodiment illustrated in FIG. 5.

FIGS. 5 and 6 show a further embodiment of the present invention particularly suitable for use with aluminum caps which are easily damaged. The cap removal means of this embodiment take the form of plates covered by a resilient material such as Nylon. The removal means 32 are connected to the selection disk 5 by means of a resilient connecting piece 44 which, for example, is made of rubber. Such a construction permits some misalignment of the aluminum caps with respect to the cap removal means 32 without the caps being damaged by the removal means. In most other respects, this embodiment of the invention is identical with the embodiment described with reference to FIGS. 1 through 4.

Hereinabove, the selection apparatus has been described on the basis of three sets of worm shafts 6 and 7 and a corresponding number of selection disks. It should be appreciated, however, that more or less assemblies may be used, thereby adapting the invention to the desired capacity of bottle caps. It should also be evident that the device according to the invention, apart from operating with bottle caps, may be applied for operation with other hollow objects open at one end, such as tins, boxes, and the like. It should be appreciated, therefore, that the invention is not restricted to the embodiments shown, but that many alterations and modifications may be made by those skilled in the art without departing from the spirit and scope thereof.

What is claimed is:

1. An apparatus for transporting hollow subjects closed at one end from a supply container containing such subjects in random orientations to a device for further use of the subjects in predetermined orientations, the device comprising: at least one transport means for transporting the subjects one by one in a continuous row from a supply container along a transport track; and means for removing the subjects from the end of the transport track in predetermined orientations, said means for removing comprising a plurality of uniformly distributed removers mounted on a common endless carrier and protruding from said carrier; means to move said removers in a motion track with a velocity equal to the transport velocity of said subjects in said transport track, said motion track being such that a remover is always located over and adjacent the last subject at the end of said transport track, and ball-like means located adjacent said transport track and cooperating with said removers for rejecting subjects which are improperly oriented in said transport track.

2. The apparatus recited in claim 1, and further comprising means for thrusting said remover toward said transport track when said remover is adjacent the last subject at the end of the transport track.

3. The apparatus according to claim 1, wherein the means for the removal of the subjects from the transport means comprises: a circular selection disk rotatable about a horizontal shaft spaced above the transport means; movable tubes protruding radially beyond the periphery of said disk; removal means at the ends of each tube for insertion in the hollow subjects; whereby the shaft of the selection disk is located in a plane substantially through the end of the transport means perpendicularly to the motion direction of the subjects; means for moving the tubes in a radial direction with respect to the shaft of the disk when the tubes are moving to the transport means; and means for thrusting the tubes radially outwardly when they have reached the lowest point of their motion track, into a position wherein the removal means enter the plane above the end of the transport means.

4. The apparatus according to claim 3, wherein the tubes are each provided with removal means and are each radially movable in recesses enclosed by the side walls of the selection disk extending radially to the periphery of the disk; wherein each tube is provided with a pin protruding perpendicularly from said tube beyond the disk; wherein said pins rest in oblong slots radially provided in one side wall of the disk; wherein said recesses are provided with springs biasing the tubes radially outwardly; wherein a fixed cam track is provided for cooperating with said pins, and is shaped in a way such that the pins are moved radially upwardly against the spring bias; and wherein said cam track ends and releases said pins just before the end of said transport track.

5. The apparatus according to claim 1, in which said removal means are connected to the selection disk by means of resilient connecting pieces and are covered with a resilient material.

6. The apparatus recited in claim 1, wherein each transport device comprises two worm shafts extending parallel with respect to each other and rotating in reverse directions; wherein the ends of said worm shafts are positioned in said supply container; wherein the worms are reversely directed in such a manner that the worm tops are adjacent each other; wherein the distance between the worm shafts is such that the openings formed between the worm shafts can enclose the subjects; and wherein a strip is provided under said worm shafts for guiding said subject.

7. The apparatus according to claim 6, wherein the end of said strip adjacent said removal means is provided with a ball, the upper side thereof coinciding with the upper side of said strip.

8. The apparatus recited in claim 6, wherein the worm shafts are positioned in said supply container at an angle.

* * * * *